F. A. FELDKAMP, H. PAYSON & W. E. WHIPPLE.
MOLDING MACHINE.
APPLICATION FILED SEPT. 16, 1915.
1,220,211.
Patented Mar. 27, 1917.
5 SHEETS—SHEET 1.
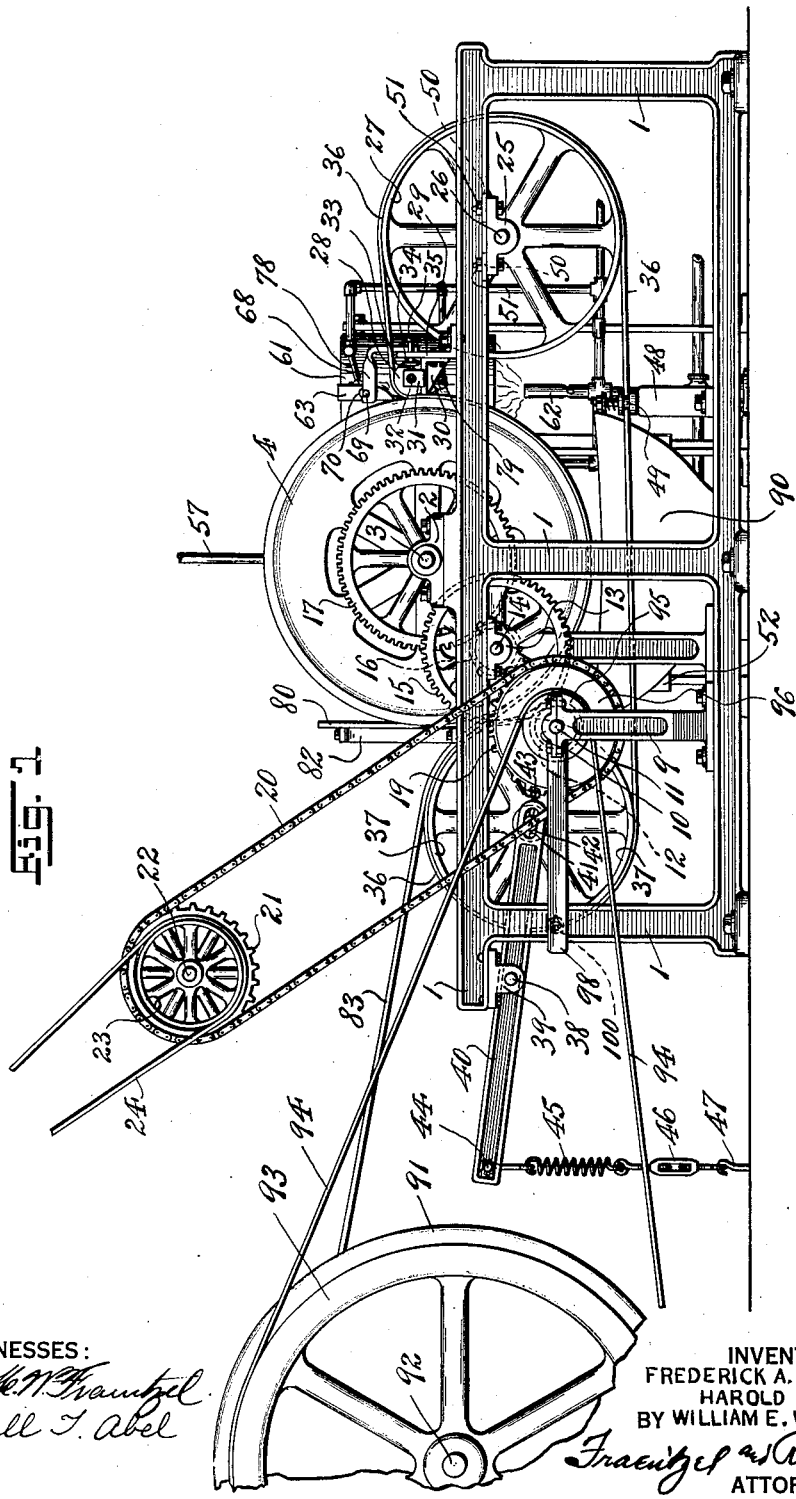
WITNESSES:
Fred'k H. W. Fraentzel
Russell T. Abel
INVENTORS:
FREDERICK A. FELDKAMP
HAROLD PAYSON &
BY WILLIAM E. WHIPPLE,
Fraentzel and Richards,
ATTORNEYS

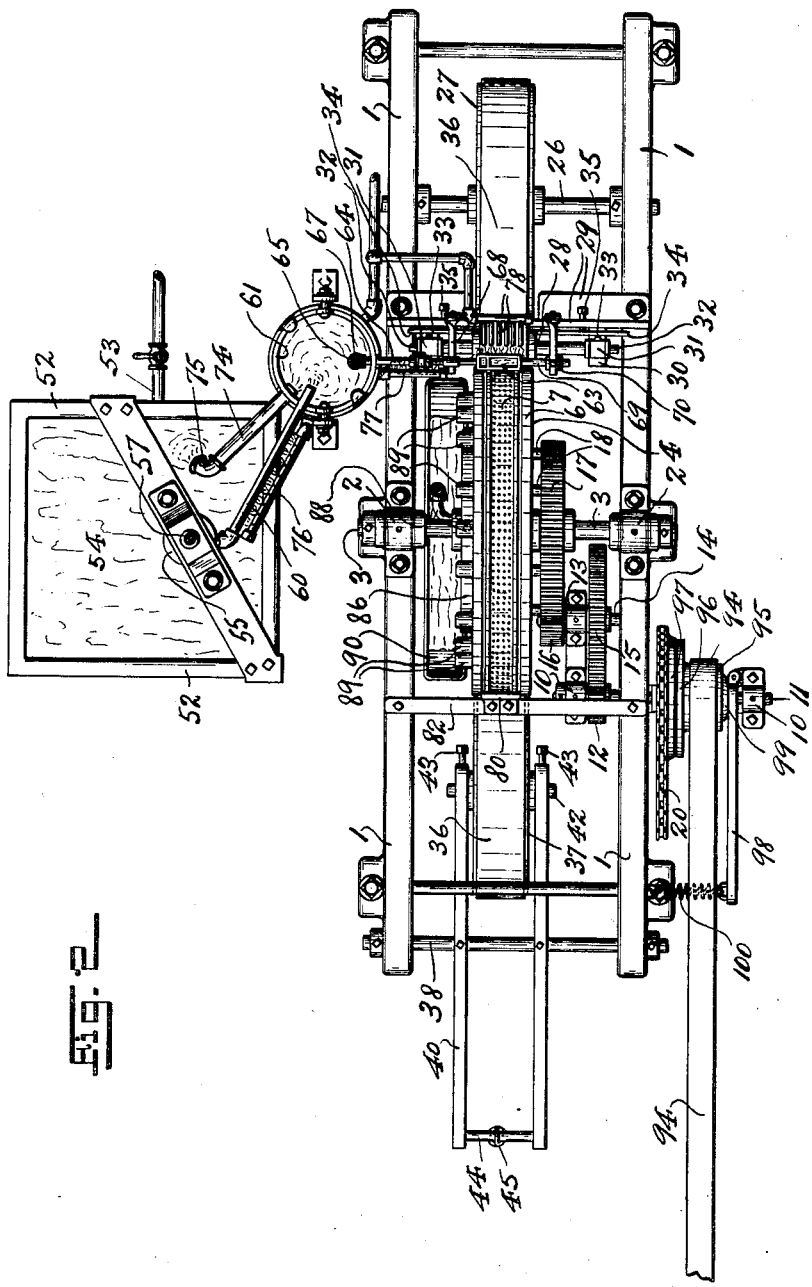

F. A. FELDKAMP, H. PAYSON & W. E. WHIPPLE.
MOLDING MACHINE.
APPLICATION FILED SEPT. 16, 1915.
1,220,211.
Patented Mar. 27, 1917.
5 SHEETS—SHEET 3.
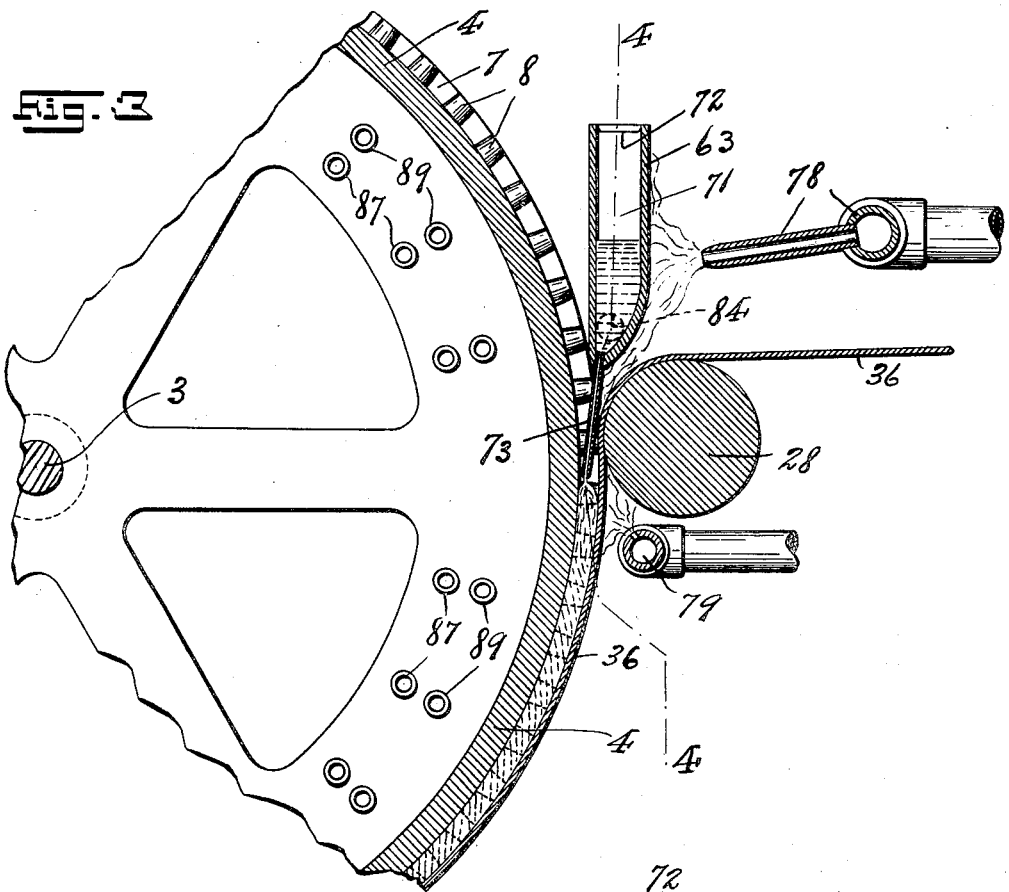
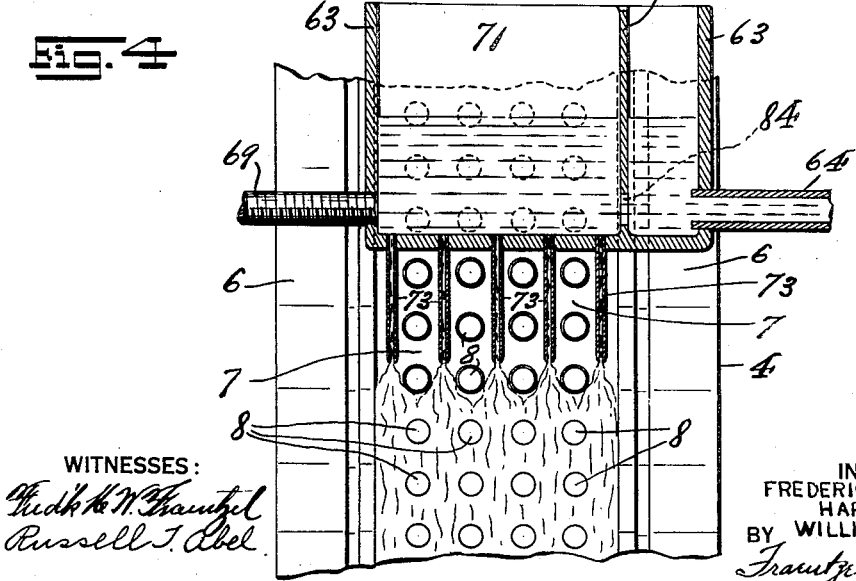
WITNESSES:
INVENTORS:
FREDERICK A. FELDKAMP
HAROLD PAYSON &
BY WILLIAM E. WHIPPLE,
ATTORNEYS

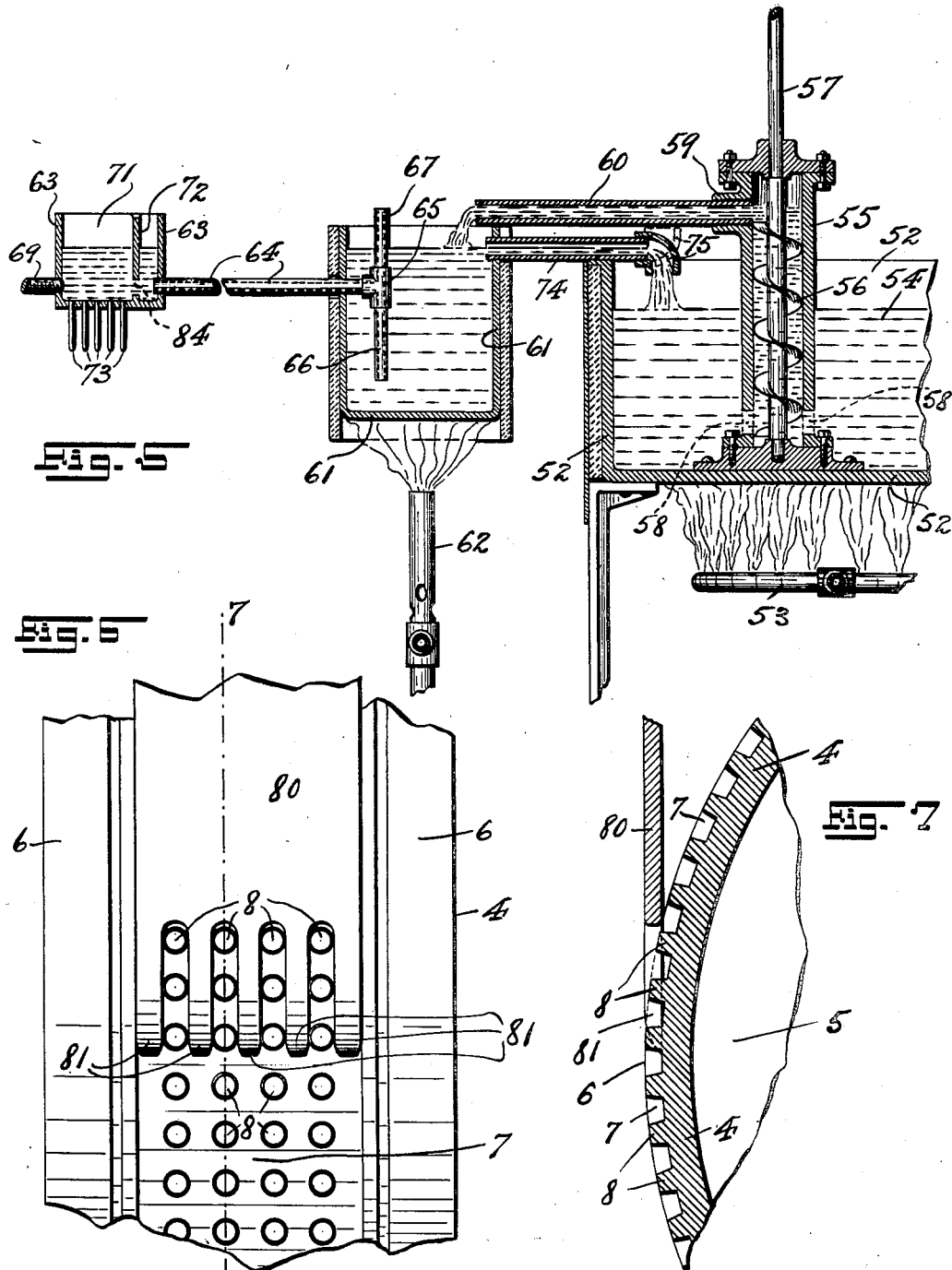

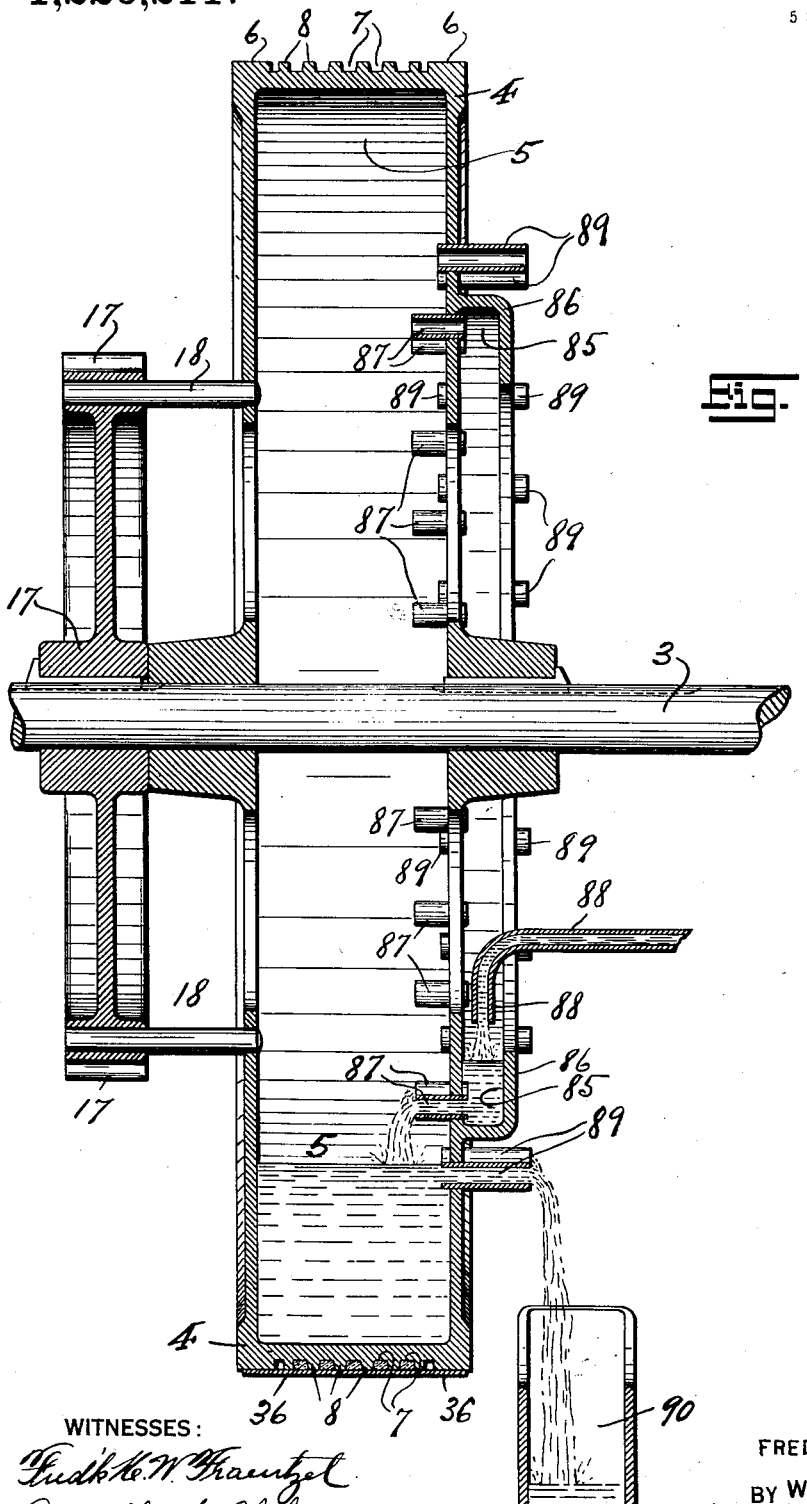

UNITED STATES PATENT OFFICE.

FREDERICK A. FELDKAMP, OF NEWARK, HAROLD PAYSON, OF SHORT HILLS, AND WILLIAM E. WHIPPLE, OF NEWARK, NEW JERSEY, ASSIGNORS TO ELECTROLYTIC PRODUCTS COMPANY, A CORPORATION OF NEW JERSEY.

MOLDING-MACHINE.

1,220,211.  Specification of Letters Patent.  Patented Mar. 27, 1917.

Application filed September 16, 1915. Serial No. 50,955.

*To all whom it may concern:*

Be it known that we, FREDERICK A. FELDKAMP, HAROLD PAYSON, and WILLIAM E. WHIPPLE, of Newark, county of Essex, and State of New Jersey, and of Short Hills, county of Morris, and State of New Jersey, and of Newark, county of Essex, and State of New Jersey, respectively, citizens of the United States, have invented certain new and useful Improvements in Molding-Machines; and we do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to a molding machine; and, the invention relates, more particularly, to a simply constructed and efficient apparatus for molding or forming molten metal into desired lengths or strips of finished product by a continuous operation.

The invention has for its principal object to provide a rotary molding apparatus by means of which a molding or forming of molten or fluid metal into desired shapes and lengths may be carried on as a continuous operation without interruption; and to this end, the present invention provides a rotary mold-element, with power transmission-means for operating the same.

The invention has for a further object to provide a novel construction of means for feeding the molten or fluid metal to the rotary mold-element.

Another object of the present invention is to provide a novel means for continuously chilling the rotary mold element as an aid to the quick solidification of the molten or fluid metal fed thereto, and thereby giving the desired configuration to the final product.

And a still further object of this invention is to provide in combination with said rotary mold-element, a novel means for removing the finished product therefrom and reeling the same up in compact form ready to be used as desired.

Other objects of the present invention, not at this time more particularly enumerated, will be clearly understood from the following detailed description of the same.

With the various objects of the present invention in view, the same consists, primarily, in the novel construction of a continuous rotary molding machine hereinafter set forth; and, the invention consists, furthermore, in the novel arrangements and combinations of the several devices and parts, as well as in the details of the construction of the same, all of which will be more fully described in detail in the following specification, and then finally embodied in the claims which are appended to and which form an essential part of the said specification.

The invention is clearly illustrated in the accompanying drawings, in which:—

Figure 1 is a side elevation of the complete continuous rotary molding machine, made according to and embodying the principles of our present invention; and Fig. 2, is a plan or top view of the same.

Fig. 3 is a detail vertical longitudinal section of a portion of the rotary molding element, showing the device for feeding or pouring the molten or fluid metal thereinto, this view being drawn on an enlarged scale; Fig. 4 is a transverse section of the same parts, taken on line 4—4 in said Fig. 3, the cover-band of the rotary molding element being removed and the latter part being shown in elevation to more clearly illustrate the flow of the molten or fluid metal thereto.

Fig. 5 is a detail transverse vertical section of the means for supplying or feeding molten or fluid metal to the molding element, some of the parts thereof being exaggerated and slightly distorted from true relative position, in order to more clearly illustrate their detail construction and relation or coöperation one with the other when operating according to the principles of our present invention.

Fig. 6 is a face view of a scraper-device for removing the molded or finished product from the rotary molding element; and Fig. 7 is a vertical section of the same, taken on line 7—7 in said Fig. 6.

Fig. 8 is a large detail transverse vertical section of said rotary molding element, illustrating, more particularly, the means for continuously chilling or cooling the same during operation, by circulating water or any other cooling fluid therethrough.

Similar characters of reference are employed in all of the hereinabove described views, to indicate corresponding parts.

Referring now to the accompanying drawings, the reference character 1 indicates a suitable supporting frame-work upon which is mounted certain portions of the mechanism comprising the novel construction of molding machine, made according to and embodying the principles of the present invention. Suitably positioned upon and connected with said frame-work 1 are a pair of laterally opposite bearing members 2, in which is journaled a laterally extending shaft 3. Secured upon said shaft 3 is a rotary molding wheel or drum 4, the same being preferably of hollow construction so that an annular interior chamber 5 is provided at its circumference. The outer circumferential face 6 of said wheel or drum 4 is cut away to provide a matrix or countersunk molding form or space 7 of any suitable shape or configuration adapted to provide the design of finished product desired. As shown in the drawings, the said matrix or molding space 7 is provided with a series of equidistant studs or cores 8, since the same is designed to produce or mold a continuous band or strip of metal, such as lead, having throughout its area a plurality of equidistant holes or perforations, said band or strip being adapted to form a core or base upon which to make an electrolytic deposit of metal, such as copper, for the production of hollow honey-combed solderless bands or strips adapted to use in the construction of automobile and other radiators, condensers, and similar devices. And, while the manufacture of such cores or bands is the main object of the molding machine illustrated in the drawings, we do not wish to be limited to such use, since it is perfectly obvious, that the design of the matrix or molding space 7 may be variously modified to produce other products, where the characteristics of unlimited length and the continuous process of manufacture entailed serves to provide the economical, quick, easy and efficient production of the product desired.

The said molding-wheel or drum 4 may be rotated through the medium of any desired construction of transmission mechanism, and as illustrative of a transmission mechanism which serves to turn the said molding wheel or drum 4 with the steady, continuous and non-vibratory movement best calculated to render the highest efficiency to the same, while serving the molding process, we have shown the following construction and arrangement of said transmission mechanism. Supported between upright standards 9, arranged in a convenient location, by the bearings 10 thereof, is a driving-shaft 11, upon which is secured a pinion 12. Rotatably mounted in the bearings 13 is a counter-shaft 14, upon which is secured a comparatively large gear-wheel 15 which meshes with and is driven by said pinion 12. Also fixed upon said counter-shaft 14 is a second pinion 16, which meshes with, and in turn, drives, a comparatively large gear-wheel 17, which is fixed upon the shaft 3 supporting and rotating said mold-wheel or drum 4. In order to insure a steady and rigid driving connection between said molding-wheel or drum 4 and its driving gear-wheel 17, in addition to their common fixed relation upon said shaft 3, a plurality of interconnecting coupling studs or shanks 18 are passed through the rim of said gear-wheel 17, and their opposite ends are affixed to the adjacent side of said molding-wheel or drum 4. Fixed upon said driving-shaft 11 is a sprocket-wheel 19, which is driven by a chain-drive 20 from a sprocket-wheel 21 secured upon an overhead counter-shaft 22, the latter being driven from any convenient source of power by means of the pulley 23 secured thereon and the belt 24 running over the same.

Connected with said supporting frame-work 1 are a pair of laterally opposite bearing-members 25, in which is journaled a shaft 26. Mounted upon said shaft 26 is a band-wheel 27, which is thus located forward or in front of said molding-wheel or drum 4.

The reference-character 28 indicates an idler roller situated adjacent to the periphery or circumferential surface of said molding-wheel or drum 4. A carrier-bar 29 is secured to said frame-work so as to extend laterally across the latter between said hand-wheel 27 and said idler-roller 28. Rearwardly projecting bracket-members 30 are secured to said carrier-bar 29. Said bracket-members 30 are adapted to slidably support the bearing-blocks 31 in which the journal-portions 32 of said idler-roller 28 are mounted. The forward sides of said bearing-blocks 31 are provided with contact-ribs or projections 33, which respectively engage the opposite ends of a spring-bar 34, said spring-bar being held in tensioned engagement with said contact-ribs or projections 33 by means of set-screws 35, which are mounted in said carrier-bar 29, and which engage said spring-bar at points intermediate of said bearings-blocks 31. The said band-wheel 27 supports an endless metallic belt 36, which is carried over said idler-roller 28, and thus into contact with the periphery or circumferential face 6 of said molding-wheel or drum 4. The spring-tension exercised by said spring-bar 34 upon the bearing-blocks 31, supporting said idler-roller 28, tends to move the latter rearward, so as to carry or force the belt 36 in close contact with the face 6 of said molding-wheel or drum 4, and at the same time such an arrangement provides a yieldable support for said idler-roller, so that if any hard, irresistible foreign matter finds its way accidentally into the matrix or molding space 7, the belt 36 will yield sufficiently to prevent injury to the matrix-form. Said belt 36, after passing over the idler-roller 28 and into contact with the molding-wheel or drum 4, runs over the lower or under portion of the face 6 of the molding-wheel or drum 4, thereby closing over or covering the matrix or molding space 7 to complete the mold for the reception of the fluid metal to be run therein. The rotary motion of the molding-wheel or drum 4 is transmitted to the endless belt 36 by the contact of the latter with the former, so that the same travels or moves simultaneously and uniformly with the molding-wheel or drum while in engagement therewith. The said endless belt 36 is in contact with said molding-wheel or drum 4 for about one-half the circumference of the latter, and after leaving the molding-wheel or drum it passes upwardly over a second band-wheel 37, and thence forward again and over the band-wheel 37. In order to maintain a close contact of said belt 36 with the molding-wheel or drum 4, the band-wheel 37 is mounted in such a manner, that it serves the function of a belt-tightener, as well as a support and guide for the belt 36. To this end, there is provided a fulcrum-shaft 38 suitably journaled in bearing members 39 to extend laterally at one end of the frame-work 1. Fixed upon said fulcrum-shaft are a pair of oscillatable carrier-arms 40, the forward ends of which are provided with elongated slots 41, in which are mounted the respective ends of a carrying shaft 42 upon which the said band-wheel 37 is rotatably mounted. Adjusting screws 43, passing through the ends of said carrier-arms 40 into the slots 41 thereof, and into retaining engagement with said carrying-shaft 42, provide a means of adjusting said band-wheel 37 relative to said molding-drum or wheel 4, in a manner and for a purpose which will be obvious upon examining the drawings. The opposite or rearward ends of said carrier-arms 40 are connected together by a tie-rod 44. Secured in a suitable manner to said tie-rod 44 is one end of a vertical pull-spring 45, the other end of which is anchored, through an intermediate turn-buckle 46, to a fixed anchor-hook 47, the turn-buckle 46 serving as a means for adjusting the operative tension of said pull-spring 45. It will be clearly understood, that the pull of said spring 45 tends to tilt or swing downward the rearward ends of said carrier-arms 40, and upward the forward ends of the same, thus lifting and holding under tension said band-wheel 37, and thereby holding said belt 36 in proper tightened contact with the circumferential surface 6 of said molding-wheel or drum 4.

Rotatably mounted upon a suitable supporting bracket 48, so as to be disposed on opposite sides of said returning portion of said endless belt 36, are a pair of flanged guide-rollers 49, whereby said belt 36 is properly guided in its travel, and maintained against accidental slipping or running off of said band-wheels and molding-wheel or drum.

Said band-wheel 27 may be adjusted toward or away from said molding-wheel or drum 4, by moving its supporting bearing-members 25 relative to said supporting frame-work 1, the latter being provided with slots 50 through which the fastening bolts 51 of said bearing-members 25 pass, and which render such adjusting movements of the latter possible, as will be apparent.

The reference-character 52 indicates a main melting pot or reservoir in which the metal, such as lead, is melted preliminary to feeding or running the same to the molding-wheel or drum 4. Situated beneath the melting pot or reservoir 52 is a gas or other burner 53 for applying the necessary heat to the melting pot or reservoir 52. Located within said melting pot or reservoir 52, so that its lower end is submerged in the melted metal 54, is the casing 55 of a lift-pump, the same comprising a lift-screw 56 mounted on a driving shaft 57 by means of which it is properly rotated from any suitable source of power. The pump-casing 55 is provided at its lower end with inlet ports 58 through which the melted metal flows into contact with the lift-screw 56, the latter lifting the same to the outlet port 59 at the upper end of the said pump-casing 55. Connected with said outlet port 59 is a conveying pipe or conduit 60.

The said conveying pipe or conduit 60 leads to an auxiliary feeding pot or reservoir 61, into which the molten metal is run from the main melting pot or reservoir 52. Arranged beneath said auxiliary feeding pot or reservoir 61 is a suitably disposed gas or other burner 62 adapted to apply heat to said pot or reservoir 61 to maintain the metal supplied thereto in molten condition.

The reference-character 63 indicates a funnel-member located adjacent to and in alinement with the matrix or molding space 7 of said molding-wheel or drum 4. A conveying pipe or conduit 64 connects one end of said funnel-member 63 with said auxiliary feeding pot or reservoir 61 and in communication therewith. The inlet end of said conveying pipe or conduit 64 extends into said auxiliary feeding pot or reservoir 61 below the level of the molten metal contained therein, and said inlet end terminates in a T-head or vertical pipe 65, the lower end or branch 66 of which extends downwardly into the molten metal, so as to terminate adjacent to the bottom of the feeding pot or reservoir 61, while the upper end or branch 67 extends upwardly, so as to project out of the molten metal contained in said feeding pot or reservoir 61. By virtue of such an arrangement, a ram-rod or similar device may be passed downwardly through said T-head or vertical pipe 65 so as to clear the inlet end of said conveying pipe or conduit 64 of any obstructions, and rendering it easy to dislodge any metal which has solidified in such inlet while the machine is idle, when reheating the feeding pot or reservoir for renewed operation.

The means for mounting or supporting said funnel-member 63 comprises a pair of bracket or supporting arms 68 secured to said carrier-bar 29, one of which engages, in supporting relation, the conveying pipe or conduit 64 adjacent to the funnel-member 63, and the other of which engages, in supporting relation, a stud-member 69, which extends outwardly from the opposite side of said funnel-member 63. In order to maintain said funnel-member 63 against lateral movement, whereby it might be disarranged from proper alinement with said molding-wheel or drum 4, said stud-member may be provided with screw-threads for the reception of locking-nuts 70, adjustably positioned on opposite sides of the bracket or supporting arm 68.

The interior of said funnel-member 63 provides a feeding-chamber 71, which is provided with a transverse wall 72 adjacent to one end, the same having a port or passage 84 adjacent to the bottom of said funnel-member chamber 71, and the purpose of which is to provide a baffle whereby the dross carried by the molten metal is separated, and retained against entrance into the main feeding-chamber 71.

The lower end of said funnel-member is provided with a plurality of outlet spouts or tubes 73, of comparatively small diameter, and which communicate with said feeding-chamber 71. The lower ends of said outlet spouts or tubes 73 project downwardly into the matrix or forming space 7 of the molding-wheel or drum 4, and straddle the studs or cores 8 thereof. Since the funnel-member 63 is located immediately above the point where the cover-band, formed by the endless belt 36 is carried into operative contact with the circumferential face of the molding wheel or drum 4, it follows that the outlet or free ends of said outlet spouts or tubes 73 will project into the matrix or forming space 7 between the bottom of the latter and the cover-band formed by said endless belt 36 (as shown more clearly in Fig. 3 of the drawings); and, consequently, the molten metal will be fed thereby only into a properly closed or covered portion of the matrix or forming space 7 of the molding-wheel or drum 4.

The level of molten metal in the funnel-member 63 is maintained the same as the level of the molten metal in said auxiliary feeding pot or reservoir 61, and the flow from the latter to the former is automatically maintained by reason of the conduit or conveying pipe 64 being positioned below such level, consequently forcing the molten metal in the funnel-member to constantly seek the level of the supply thereto contained in the pot or reservoir 61 as fast as the metal is drawn or flows out of the funnel-member through the outlet spouts or tubes 73 into the matrix or forming space of the molding-wheel or drum 4. Since, therefore, the level of the molten metal in said auxiliary feeding pot or reservoir 61 determines the automatic flow to the funnel-member 63, and thence to the matrix or forming space 7 of the molding-wheel or drum 4, it follows that means must be provided for automatically maintaining the level of the molten metal in said feeding pot or reservoir 61 constant. To this end, we provide an overflow or return conduit or pipe 74 in communication with said feeding pot or reservoir 61 and leading back or returning to said main melting pot or reservoir 52, whereby a constant circulation of molten metal, as pumped from the latter to the former, is maintained; and, consequently, the level of the molten metal in the former is constantly and automatically corrected in proportion to the outflow from the same, and it also follows that the rate of flow of molten metal from the main melting pot or reservoir must be slightly greater in velocity than the rate of the outflow from the auxiliary feeding pot or reservoir 61.

It is sometimes desirable to vary the volume of molten metal in the funnel-member 63, so that the best rate of feed or flow of molten metal therefrom to the matrix or forming space 7 of the rotating molding-wheel or drum 4 may be provided, so that the flow of molten metal into the matrix or molding space will be neither too fast nor too slow, but in such exact proportion to the speed or rotation of the mold as will allow time for the complete filling up of the interstices of the matrix or forming space 7. This adjustment of the volume of molten metal maintained in the funnel-member 63 may be accomplished by raising or lowering the level in the feeding pot or reservoir 61, the former increasing the volume, and the latter decreasing the volume in the funnel-member. To this end, the said overflow or return conduit or pipe 74 is provided at its discharge end with an elbow 75 in swiveling connection therewith, so that by turning the elbow, to elevate or lower its discharge mouth or outlet, the level may be proportionately raised or lowered in the feeding pot or reservoir 61, as will be clearly apparent.

In order to maintain the metal in proper molten condition throughout the various stages of its flow to the molding-wheel or drum 4, it is essential to provide heating-devices at different points, and consequently we provide a gas or other suitable burner 76 adapted to direct a heating flame against the conveying pipe or conduit 60, and a similar gas or other suitable burner 77 adapted to direct a heating flame against the conveying pipe or conduit 64. In like manner, a gas or other suitable burner 78 is arranged to direct a heating flame against the funnel-member 63 and its outlet spouts or tubes 73. In order to prevent premature solidification of the molten metal, as it flows into the matrix or forming space 7 of the molding-wheel or drum 4, we provide a suitable gas or other burner 79 adapted to direct a heating flame against the endless belt 36 as it leaves the idler-roller 28 and engages to the matrix or forming space 7 thereof, and adjacent to the point of entrance of the molten metal into said matrix or forming space 7. Of course it will be apparent, that these various burners may be subject to great variation in form and construction, and that they may be connected with a main gas or other fuel-supply in various ways, and we desire to claim no particular construction or arrangement of burner, but only the presence of a heating element in the locations and for the purposes above pointed out.

From an inspection of the drawings, and from the above description, it will be readily understood how the molten metal is constantly and continuously fed or conveyed to the rotating molding wheel or drum 4, so that the matrix or forming space is continuously fed with molten metal as it approaches and passes the point of entrance of the same. The filled part of the matrix or molding space 7 is constantly carried or moved on by the rotation of the molding-wheel or drum 4, and the molten metal solidifies therein and takes the form of the matrix or molding space 7. Upon the opposite side of the molding-wheel or drum 4 is located a suitably formed scraper-member 80 having chamfered fingers 81 which enter the matrix or forming space 7, and which straddle the studs or covers 8, at a point above where the belt 36 leaves the circumferential surface of the molding-wheel or drum 4 to run over the band-wheel 37. Said scraper-member 80 is suitably supported by a carrier-bar 82 secured to the frame-work 1. When the solidified or molded metal contacts with the fingers 81 of the scraper-member 80, it is lifted thereby out of the matrix or forming space 7, and is fed forward in the form of a completed continuous band or strip of finished product 83 ready to be rolled up on the receiving reel 91, as will be subsequently described.

In order to hasten the solidification of the metal in the matrix or forming space 7, before it reaches the point of emergence therefrom, as determined by the location of the scraper-member 80, we provide means for cooling or chilling that portion of the molding-wheel or drum 4 in which the molded metal is being carried. This means comprises the inner annular chamber 5 formed by the hollow portion of the wheel or drum 4, into which water, or other cooling element is introduced and circulated. Formed in connection with one face or side of said molding-wheel or drum 4, so as to project outwardly therefrom, is a catch-channel 85 formed by the right angled flange 86. Communicating with said catch-channel 85, throughout its annular extent, and at suitable intervals, are a series of in-flow pipes or leaders 87 which extend into said chamber 5 from the catch-channel 85. A water-supply pipe 88 is arranged so that its outlet end registers over the catch-channel 85; hence, the water flowing therefrom is received in said catch-channel 85, and flows thence through said in-flow pipes or leaders 87 into said chamber 5 and in contact with a portion of the back or bottom-wall of that part of said matrix or forming space 7 in which the molded metal is being carried, consequently cooling or chilling the part of the molding-wheel or drum 4 and hastening the solidification of the molded metal. Connected with said side-wall of said molding-wheel or drum are a series of out-flow pipes or leaders 89, disposed outside of said flange 86, and consequently below said catch-channel 85, the same communicating with said chamber 5 and providing over-flow outlets for the water contained therein. The water discharged from said out-flow pipes or leaders 89 is caught in a basin 90 which may be connected with sewer or drainage pipes to carry off the water. In this manner, the water is constantly circulated in the chamber 5, so that cool water is continuously taking the place of that which has absorbed the heat from the molding-wheel or drum and its contents. It will be apparent, that since the catch-channel 85 and the chamber 5 are annular, that is in conformance to the circumference of the molding-wheel or drum, and since the pipes or leaders 87 and 89 are arranged at intervals around the entire circumference of the molding-wheel or drum 4, it follows that the rotation of the wheel or drum 4 in no way interferes with the flow of water into and out of the chamber 5, and that the cooling water is shifted as needed by gravity, so that its effects are utilized only on that constantly shifting portion of the molding-wheel or drum-circumference, adjacent to which the molded metal lies.

The finished product 83, as it comes off of the molding-wheel or drum 4, is carried rearwardly to the reel 91, which is mounted in any convenient manner on the shaft 92, and the end thereof is fastened to the reel. Secured upon the shaft 92 is a driving-pulley 93, over which runs a driving-belt 94. Said driving-belt 94 is driven by a pulley 95 loosely mounted on the driving-shaft 11. Said pulley 95 is provided with a friction clutch-plate 96 which coöperates with a friction clutch-plate 97 rigidly connected with and driven by the sprocket-wheel 19. A lever-arm 98, pivoted to one of the bearings 10 of a standard 9, is fulcrumed to swing against the hub 99 of the pulley 95 to move the latter inwardly and thereby force its clutch-plate 96 in frictional engagement with the clutch-plate 97 of the sprocket-wheel 19, whereby the rotation of the latter is imparted to said pulley-wheel 95 for driving or rotating the reel 91. A pull-spring 100 connected between the free end of said lever-arm 98 and the frame-work 1, exercises sufficient pull upon said lever-arm to maintain the clutch-plates 96 and 97 in proper power-transmitting relation one to the other. The advantage of the above described transmission-mechanism for the reel 91 is that it is simultaneously driven from the same source of power as the molding-wheel or drum 4, and at the same time, as the diameter of the coil of reeled up finished product 83 enlarges on the reel 91, and consequently the latter must be driven at a decreasing speed in order to compensate the winding movement of the reel to the rate of speed at which the finished product issues from the molding wheel or drum, the friction clutch-plates 96 and 97 will slip with relation to each other, so as to automatically correct or compensate the rotary movement of the reel 91, and there is therefore no undue strain or stress placed upon said finished product as it issues from the molding wheel or drum.

We are aware that changes may be made in the general arrangements and combinations of the various devices and parts, as well as in the details of the construction of the said parts without departing from the scope of the present invention as set forth in the foregoing specification and as defined in the clauses of the claims which are appended to the said specification. Hence, we do not limit our present invention to the exact arrangements and combinations of the various devices and parts as described in the said specification, nor do we confine ourselves to the exact details of the construction of the said parts, as illustrated in the accompanying drawings.

We claim:—

1. A continuous molding machine comprising a rotary molding-wheel having a matrix on its circumferential face, an endless belt running in engagement with a portion of the circumference of said molding-wheel to provide a closing member for said matrix, a melting pot, a funnel-member having outlet means entering said matrix and extending slightly beyond the junction of said endless belt with said molding-wheel, and means for automatically and continuously supplying molten metal from said melting-pot to said funnel-member.

2. A continuous molding machine comprising a rotary molding-wheel having a matrix on its circumferential face, an endless belt running in engagement with a portion of the circumference of said molding-wheel to provide a closing member for said matrix, a melting-pot, a feeding-pot, pump-means for supplying said feeding-pot with molten metal from said melting-pot, an adjustable overflow return pipe leading from said feeding-pot back to said melting-pot, a funnel-member having outlet means entering said matrix at the junction of said endless belt with said molding-wheel, a conduit-pipe leading from said feeding-pot to said funnel-member, the same being positioned beneath the normal level of the molten metal in said feeding-pot, and means for applying heat to said molten metal-containers and conveying means.

3. A continuous molding machine comprising a rotary molding-wheel having a matrix on its circumferential face, an endless belt running in engagement with a portion of the circumference of said molding-wheel to provide a closing member for said matrix, a melting-pot, a feeding-pot, pump-means for supplying said feeding-pot with molten metal from said melting-pot, an adjustable overflow return pipe leading from said feeding-pot back to said melting-pot, a funnel-member having outlet means entering said matrix at the junction of said endless belt with said molding-wheel, a conduit-pipe leading from said feeding-pot to said funnel-member, the same being positioned beneath the normal level of the molten metal in said feeding-pot, means for applying heat to said molten metal-containers and conveying means, and means for chilling that portion of the molding-wheel and its matrix into which the molten metal has been received.

4. A continuous molding machine comprising a rotary molding-wheel having a matrix on its circumferential face, an endless belt running in engagement with a portion of the circumference of said molding-wheel to provide a closing member for said matrix, a melting-pot, a feeding-pot, pump-means for supplying said feeding-pot with molten metal from said melting-pot, an adjustable overflow return pipe leading from said feeding-pot back to said melting-pot, a funnel-member having outlet means entering said matrix at the junction of said endless belt with said molding-wheel, a conduit-pipe leading from said feeding pot to said funnel-member, the same being positioned beneath the normal level of the molten metal in said feeding-pot, means for applying heat to said molten metal-containers and conveying means, means for chilling that portion of the molding-wheel and its matrix into which the molten metal has been received, and means for removing the molded metal from the said matrix after solidification.

5. A continuous molding machine comprising a rotary molding-wheel having a matrix on its circumferential face, an endless belt running in engagement with a portion of the circumference of said molding-wheel to provide a closing member for said matrix, a melting pot, a feeding-pot, pump-means for supplying said feeding-pot with molten metal from said melting-pot, an adjustable overflow return pipe leading from said feeding-pot back to said melting-pot, a funnel-member having outlet means entering said matrix at the junction of said endless belt with said molding-wheel, a conduit-pipe leading from said feeding-pot to said funnel-member, the same being positioned beneath the normal level of the molten metal in said feeding-pot, means for applying heat to said molten metal-containers and conveying means, and means for applying heat to said endless belt and the matrix of said molding-wheel at a point adjacent to the entrance of molten metal into said matrix.

6. A continuous molding machine comprising a rotary molding-wheel having a matrix on its circumferential face, an endless belt running in engagement with a portion of the circumference of said molding-wheel to provide a closing member for said matrix, a melting-pot, a funnel-member having outlet means entering said matrix and extending slightly beyond the junction of said endless belt with said molding wheel, means for automatically and continuously supplying molten metal from said melting-pot to said funnel-member, and means for applying heat to said endless belt and the matrix of said molding-wheel at a point slightly beyond the entrance of molten metal into said matrix.

7. A continuous molding machine comprising a rotary molding-wheel having a matrix on its circumferential face, an endless belt running in engagement with a portion of the circumference of said molding-wheel to provide a closing member for said matrix, a melting-pot, a feeding-pot, pump-means for supplying said feeding-pot with molten metal from said melting-pot, an adjustable overflow return pipe leading from said feeding-pot back to said melting-pot, a funnel-member having outlet means entering said matrix at the junction of said endless belt with said molding-wheel, a conduit-pipe leading from said feeding-pot to said funnel-member, the same being positioned beneath the normal level of the molten metal in said feeding-pot, means for applying heat to said molten metal-containers and conveying means, means for applying heat to said endless belt and the matrix of said molding-wheel at a point adjacent to the entrance of molten metal into said matrix, and means for chilling that portion of the molding wheel and its matrix into which the molten metal has been received.

8. A continuous molding machine comprising a rotary molding wheel having a matrix on its circumferential face, an endless belt running in engagement with a portion of the circumference of said molding-wheel to provide a closing member for said matrix, a melting-pot, a feeding-pot, pump-means for supplying said feeding-pot with molten metal from said melting-pot, an adjustable overflow return pipe leading from said feeding-pot back to said melting-pot, a funnel-member having outlet means entering said matrix at the junction of said endless belt with said molding-wheel, a conduit-pipe leading from said feeding-pot to said funnel-member, the same being positioned beneath the normal level of the molten metal in said feeding-pot, means for applying heat to said molten metal-containers and conveying means, and means for applying heat to said endless belt and the matrix of said molding-wheel at a point adjacent to the entrance of molten metal into said matrix, means for chilling that portion of the molding-wheel and its matrix into which the molten metal has been received, and means for removing the molded metal from the said matrix after solidification.

9. A continuous molding machine comprising a frame-work, a rotary molding-wheel having a matrix on its circumferential face mounted on said frame-work, a driving-shaft, a driving sprocket-wheel on said driving shaft, intermediate transmission-gearing between said driving shaft and said molding-wheel, a band-wheel mounted on said frame-work forward of said molding-wheel, an idler-roller, adjustable tension means for holding said idler-roller yieldingly to the circumferential face of said molding-wheel, a second band-wheel mounted rearwardly of said molding-wheel, an endless belt running over said first mentioned band-wheel and said idler-roller into engagement with a portion of the circumference of said molding-wheel to provide a closing-member for said matrix and returning over said second band-wheel, means for mounting said second band-wheel so as to place said endless belt under tightening tension, and means for introducing molten metal into the closed portion of said matrix.

10. A continuous molding machine comprising a frame-work, a rotary molding-wheel having a matrix on its circumferential face mounted on said frame-work, a driving-shaft, a driving sprocket-wheel on said driving shaft, intermediate transmission-gearing between said driving shaft and said molding-wheel, a band-wheel mounted on said frame-work forward of said molding-wheel, an idler-roller, adjustable tension means for holding said idler-roller yieldingly to the circumferential face of said molding-wheel, a second band-wheel mounted rearwardly of said molding-wheel, an endless belt running over said first mentioned band-wheel and said idler-roller into engagement with a portion of the circumference of said molding-wheel to provide a closing-member for said matrix and returning over said second band-wheel, means for mounting said second band-wheel so as to place said endless belt under tightening tension, means for introducing molten metal into the closed portion of said matrix, and means for chilling that portion of the molding-wheel and its matrix into which the molten metal has been received.

11. A continuous molding machine comprising a frame-work, a rotary molding-wheel having a matrix on its circumferential face mounted on said frame-work, a driving-shaft, a driving sprocket-wheel on said driving shaft, intermediate transmission-gearing between said driving shaft and said molding-wheel, a band-wheel mounted on said frame-work forward of said molding-wheel, an idler-roller, adjustable tension means for holding said idler-roller yieldingly to the circumferential face of said molding-wheel, a second band-wheel mounted rearwardly of said molding-wheel; an endless belt running over said first mentioned band-wheel and said idler-roller into engagement with a portion of the circumference of said molding-wheel to provide a closing-member for said matrix and returning over said second band-wheel, means for mounting said second band-wheel so as to place said endless belt under tightening tension, and means for introducing molten metal into the closed portion of said matrix, means for chilling that portion of the molding wheel and its matrix into which the molten metal has been received, and means for removing the molded metal from the said matrix after solidification.

12. A continuous molding machine comprising a frame-work, a rotary molding-wheel having a matrix on its circumferential face mounted on said frame-work, a driving-shaft, a driving sprocket-wheel on said driving shaft, intermediate transmission-gearing between said driving shaft and said molding-wheel, a band-wheel mounted on said frame-work forward of said molding-wheel, an idler-roller, adjustable tension means for holding said idler-roller yieldingly to the circumferential face of said molding-wheel, a second band-wheel mounted rearwardly of said molding-wheel, an endless belt running over said first-mentioned band-wheel and said idler-roller into engagement with a portion of the circumference of said molding-wheel to provide a closing-member for said matrix and returning over said second band-wheel, means for mounting said second band-wheel so as to place said endless belt under tightening tension, and means for introducing molten metal into the closed portion of said matrix, means for chilling that portion of the molding-wheel and its matrix into which the molten metal has been received, and means for removing the molded metal from the said matrix after solidification, a reel to which the band of molded metal issuing from said molding-wheel is attached, a pulley-wheel connected with said reel, a driving belt running over said pulley, a pulley loosely mounted on said driving shaft for operating said driving-belt, a compensating friction-clutch between said loose-pulley and said sprocket-wheel, and means for normally holding said friction-clutch in operative condition.

13. A continuous molding machine comprising a frame-work, a rotary-molding wheel having a matrix on its circumferential face mounted on said frame-work, a driving-shaft, a driving sprocket-wheel on said driving shaft, intermediate transmission-gearing between said driving shaft and said molding-wheel, a band-wheel mounted on said frame-work forward of said molding-wheel, an idler-roller, adjustable tension means for holding said idler-roller yieldingly to the circumferential face of said molding-wheel, a second band-wheel mounted rearwardly of said molding wheel, an endless belt running over said first-mentioned band-wheel and said idler-roller into engagement with a portion of the circumference of said molding-wheel to provide a closing-member for said matrix and returning over said second band-wheel, means for mounting said second band-wheel so as to place said endless belt under tightening tension, a melting pot, a funnel-member having outlet means entering said matrix at the junction of said endless belt with said molding-wheel, and means for automatically and continuously supplying molten metal from said melting-pot to said funnel-member.

14. A continuous molding machine comprising a frame-work, a rotary molding wheel having a matrix on its circumferential face mounted on said frame-work, a driving-shaft, a driving sprocket-wheel on said driving shaft, intermediate transmission-gearing between said driving shaft and said molding-wheel, a band-wheel mounted on said frame-work forward of said molding-wheel, an idler-roller, adjustable tension means for holding said idler-roller yieldingly to the circumferential face of said molding-wheel, a second band-wheel mounted rearwardly of said molding-wheel, an endless belt running over said first-mentioned band-wheel and said idler-roller into engagement with a portion of the circumference of said molding-wheel to provide a closing-member for said matrix and returning over said second band-wheel, means for mounting said second band-wheel so as to place said endless belt under tightening tension, a melting pot, a funnel-member having outlet means entering said matrix at the junction of said endless belt with said molding-wheel, means for automatically and continuously supplying molten metal from said melting-pot to said funnel-member, and means for removing the molded metal from the said matrix after solidification.

15. A continuous molding machine comprising a frame-work, a rotary molding-wheel having a matrix on its circumferential face mounted on said frame-work, a driving-shaft, a driving sprocket-wheel on said driving shaft, intermediate transmission-gearing between said driving shaft and said molding-wheel, a band-wheel mounted on said frame-work forward of said molding-wheel, an idler-roller, adjustable tension means for holding said idler-roller yieldingly to the circumferential face of said molding-wheel, a second band-wheel mounted rearwardly of said molding wheel, an endless belt running over said first-mentioned band-wheel and said idler-roller into engagement with a portion of the circumference of said molding-wheel to provide a closing-member for said matrix and returning over said second band-wheel, means for mounting said second band-wheel so as to place said endless belt under tightening tension, a melting pot, a funnel-member having outlet means entering said matrix at the junction of said endless belt with said molding-wheel, means for automatically and continuously supplying molten metal from said melting-pot to said funnel-member, and means for removing the molded metal from the said matrix after solidification, a reel to which the band of molded metal issuing from said molding-wheel is attached, a pulley-wheel connected with said reel, a driving belt running over said pulley loosely mounted on said driving shaft for operating said driving-belt, a compensating friction-clutch between said loose-pulley and said sprocket-wheel, and means for normally holding said friction clutch in operative condition.

16. A continuous molding machine comprising a frame-work, a rotary molding-wheel having a matrix on its circumferential face mounted on said frame-work, a driving-shaft, a driving sprocket-wheel on said driving shaft, intermediate transmission-gearing between said driving shaft and said molding-wheel, a band-wheel mounted on said frame-work forward of said molding-wheel, an idler-roller, adjustable tension means for holding said idler-roller yieldingly to the circumferential face of said molding-wheel, a second band-wheel mounted rearwardly of said molding wheel, an endless belt running over said first-mentioned band-wheel and said idler-roller into engagement with a portion of the circumference of said molding-wheel to provide a closing-member for said matrix and returning over said second band-wheel, means for mounting said second band-wheel so as to place said endless belt under tightening tension, a melting pot, a funnel-member having outlet means entering said matrix at the junction of said endless belt with said molding-wheel, means for automatically and continuously supplying molten metal from said melting-pot to said funnel-member, and means for applying heat to said endless belt and the matrix of said molding-wheel at a point adjacent to the entrance of molten metal into said matrix.

17. A continuous molding machine comprising a frame-work, a rotary molding-wheel having a matrix on its circumferential face mounted on said frame-work, a driving-shaft, a driving sprocket-wheel on said driving shaft, intermediate transmission-gearing between said driving shaft and said molding-wheel, a band-wheel mounted on said frame-work forward of said molding-wheel, an idler-roller, adjustable tension means for holding said idler-roller yieldingly to the circumferential face of said molding-wheel, a second band-wheel mounted rearwardly of said molding-wheel, an endless belt running over said first-mentioned band-wheel and said idler-roller into engagement with a portion of the circumference of said molding-wheel to provide a closing-member for said matrix and returning over said second band-wheel, means for mounting said second band-wheel so as to place said endless belt under tightening tension, a melting pot, a funnel-member having outlet means entering said matrix at the junction of said endless belt with said molding-wheel, means for automatically and continuously supplying molten metal from said melting-pot to said funnel-member, and means for applying heat to said endless belt and the matrix of said molding-wheel at a point adjacent to the entrance of molten metal into said matrix, and means for removing the molded metal from the said matrix after solidification.

18. A continuous molding machine comprising a frame-work, a rotary molding-wheel having a matrix on its circumferential face mounted on said frame-work, a driving-shaft, a driving sprocket-wheel on said driving shaft, intermediate transmission-gearing between said driving shaft and said molding-wheel, a band-wheel mounted on said frame-work forward of said molding-wheel, an idler-roller, adjustable tension means for holding said idler-roller yieldingly to the circumferential face of said molding-wheel, a second band-wheel mounted rearwardly of said molding-wheel, an endless belt running over said first-mentioned band-wheel and said idler into engagement with a portion of the circumference of said molding-wheel to provide a closing-member for said matrix and returning over said second band-wheel, means for mounting said second band-wheel so as to place said endless belt under tightening tension, a melting pot, a funnel-member having outlet means entering said matrix at the junction of said endless belt with said molding-wheel, means for automatically and continuously supplying molten metal from said melting-pot to said funnel-member, and means for applying heat to said endless belt and the matrix of said molding-wheel at a point adjacent to the entrance of molten metal into said matrix, and means for removing the molded metal from the said matrix after solidification, a reel to which the band of molded metal issuing from said molding-wheel is attached, a pulley-wheel connected with said reel, a driving belt running over said pulley, a pulley loosely mounted on said driving shaft for operating said driving-belt, a compensating friction-clutch between said loose-pulley and said sprocket-wheel, and means for normally holding said friction-clutch in operative position.

19. In a continuous molding machine the combination with a hollow rotary molding-wheel provided with an interior annular chamber and having a matrix on its circumferential face, of means for introducing a cooling fluid into said annular chamber comprising an exteriorly projecting right-angled flange projecting outwardly from one side wall of said molding-wheel to provide a catch-channel, a series of tubular leaders providing inlets extending from said catch-channel into said annular chamber, and spaced at intervals around the entire circumference of said catch-channel, and a second series of tubular leaders providing outlets extending outwardly from said annular chamber exteriorly of said catch-channel, and spaced at intervals around the entire circumference of said annular chamber, for the purposes described.

20. In a continuous molding machine comprising a rotary molding-wheel having a matrix on its circumferential face, an endless belt running in engagement with a portion of the circumference of said molding-wheel to provide a closing member for said matrix, and means for mounting said endless belt comprising a fixed band-wheel, an idler-roller, adjustable tension-means for holding said idler-roller yieldingly to the circumferential face of said molding wheel, a second band-wheel, and means for mounting said second band-wheel so as to place said endless belt under tightening tension.

21. In a continuous molding machine comprising a rotary molding-wheel having a matrix on its circumferential face, an endless belt running in engagement with a portion of the circumference of said molding-wheel to provide a closing member for said matrix, and means for mounting said endless belt comprising a fixed band-wheel, an idler-roller, adjustable tension-means for holding said idler-roller yieldingly to the circumferential face of said molding-wheel, a second band-wheel, and means for mounting said second band-wheel so as to place said endless belt under tightening tension, comprising a pivoted carrying-frame in one end of which said second band-wheel is mounted, and a pull-spring-means connected with the other end of said carrying-frame for oscillating the same to lift said second band-wheel against said endless-belt.

22. In a continuous molding machine comprising a rotary molding-wheel having a matrix on its circumferential face, an endless belt running in engagement with a portion of the circumference of said molding-wheel to provide a closing member for said matrix, and means for mounting said endless belt comprising a fixed band-wheel, an idler-roller, adjustable tension-means for holding said idler-roller yieldingly to the circumferential face of said molding-wheel, a second band-wheel, and means for mounting said second band-wheel so as to place said endless belt under tightening tension, comprising a pivoted carrying-frame in one end of which said second band-wheel is mounted, a pull-spring-means connected with the other end of said carrying-frame for oscillating the same to lift said second band-wheel against said endless belt, and means for adjusting the tension of said pull-spring.

In testimony that we claim the invention set forth above we have hereunto set our hands this ninth day of August, 1915.

FREDERICK A. FELDKAMP.
HAROLD PAYSON.
WILLIAM E. WHIPPLE.

Witnesses:
Fred'k C. Fraentzel,
Fred'k H. W. Fraentzel.